US010144097B2

(12) United States Patent
Groche et al.

(10) Patent No.: US 10,144,097 B2
(45) Date of Patent: Dec. 4, 2018

(54) SENSOR-CONTAINING CONNECTION ELEMENT AND MANUFACTURING METHOD (71) Applicant: GLBS Patentverwertungsgesellschaft GbR, Darmstadt (DE)

(72) Inventors: Peter Groche, Darmstadt (DE); Matthias Brenneis, Darmstadt (DE)

(73) Assignee: GLBS PATENTVERWERTUNGSGESELLSCHAFT GBR (DE)

( * ) Notice: Subject to any disclaimer, the term of this patent is extended or adjusted under 35 U.S.C. 154(b) by 317 days.

(21) Appl. No.: 14/982,265

(22) Filed: Dec. 29, 2015

(65) Prior Publication Data
US 2016/0107273 A1 Apr. 21, 2016

Related U.S. Application Data (62) Division of application No. 14/385,448, filed as application No. PCT/EP2013/000824 on Mar. 19, 2013, now Pat. No. 9,249,820.

(30) Foreign Application Priority Data

Mar. 22, 2012 (DE) ........................ 10 2012 005 614

(51) Int. Cl.
*F16B 4/00* (2006.01)
*B23P 11/02* (2006.01)
(Continued)

(52) U.S. Cl.
CPC .............. *B23P 11/025* (2013.01); *B21K 1/44* (2013.01); *B21K 25/00* (2013.01); *F16B 31/02* (2013.01);
(Continued)

(58) Field of Classification Search
CPC ......... B23P 13/00; B23P 11/005; B23P 11/02; B23P 11/025; F16B 4/004; F16B 4/006;
(Continued)

(56) References Cited

U.S. PATENT DOCUMENTS 2,503,141 A 4/1950 Stone
2,600,029 A 6/1952 Stone
(Continued)

FOREIGN PATENT DOCUMENTS

DE 3934952 A1 4/1991
DE 4421959 A1 1/1996
(Continued)

OTHER PUBLICATIONS

World Intellectual Property Organization (WIPO), International Application (PCT) Publication No. WO 2013/139464 A1 published with International Search Report, dated Sep. 26, 2013.
(Continued)

*Primary Examiner* — Sarang Afzali
*Assistant Examiner* — Darrell C Ford
(74) *Attorney, Agent, or Firm* — Christopher C. Dremann, P.C.; Christopher C. Dremann (57) ABSTRACT A connection element consists of a longitudinally oriented support structure that is at least partially hollow and a sensor unit that is arranged in the inside of the support structure, is connected to a signal transmission device, and is non-positively connected to the support structure. The required force for the non-positive connection is produced by internal stresses after a plastic deformation of the support structure during a joining process of the support structure and the sensor unit. A method for manufacturing a connection element consisting of a support structure that is at least partially hollow and a sensor unit includes positioning the sensor unit in a region of the support structure and, using radially
(Continued)

movable tool segments, exerting a force on the support structure in the radial direction and at the same time reducing the periphery of the support structure in the region in which the sensor unit is positioned.

12 Claims, 8 Drawing Sheets

(51) Int. Cl.
  B23P 13/00 (2006.01)
  B21D 39/04 (2006.01)
  B21K 25/00 (2006.01)
  B21K 1/44 (2006.01)
  F16B 31/02 (2006.01)
  G01L 5/24 (2006.01)
  G01L 5/00 (2006.01)

(52) U.S. Cl.
  CPC .......... *F16B 31/025* (2013.01); *G01L 5/0004* (2013.01); *G01L 5/24* (2013.01); *Y10T 29/49865* (2015.01); *Y10T 29/49925* (2015.01)

(58) Field of Classification Search
  CPC ............. B21D 39/048; Y10T 29/49861; Y10T 29/49863; Y10T 29/49865; Y10T 29/49908; Y10T 29/49913; Y10T 29/49002; Y10T 29/49004
  USPC ...... 29/445, 446, 447, 505, 508, 592.1, 593; 73/204, 204.21
  See application file for complete search history.

(56) References Cited

U.S. PATENT DOCUMENTS

| | | | |
|---|---|---|---|
| 2,747,454 A | 5/1956 | Bowersett | |
| 3,212,325 A | 10/1965 | Katz et al. | |
| 3,589,234 A | 6/1971 | Trigg | |
| 3,799,108 A * | 3/1974 | Mosow | F16B 31/02 116/212 |
| 3,850,133 A | 11/1974 | Johnson | |
| 3,943,819 A | 3/1976 | Charron | |
| 3,954,004 A | 5/1976 | Orner | |
| RE30,183 E | 1/1980 | Popenoe | |
| 4,553,124 A * | 11/1985 | Malicki | F16B 31/025 338/2 |
| 4,569,229 A | 2/1986 | de Halleux | |
| 4,676,109 A | 6/1987 | Wallace | |
| 4,708,547 A | 11/1987 | Baron | |
| 4,709,654 A | 12/1987 | Smith | |
| 4,904,132 A | 2/1990 | Popenoe | |
| 5,203,278 A | 4/1993 | Kinney | |
| 5,586,851 A | 12/1996 | Haage | |
| 6,303,013 B1 * | 10/2001 | Watanabe | G01N 27/4077 204/279 |
| 6,351,997 B1 | 3/2002 | Loffler | |
| 6,832,881 B2 | 12/2004 | DuKart et al. | |
| 7,293,466 B2 | 11/2007 | Ohta et al. | |
| 7,412,898 B1 | 8/2008 | Smith et al. | |
| 7,973,671 B2 | 7/2011 | Cloutier et al. | |
| 8,636,532 B2 * | 1/2014 | Masuda | G01N 27/4062 204/426 |
| 9,897,563 B2 * | 2/2018 | Silveri | G01N 27/08 |
| 9,964,502 B2 * | 5/2018 | Pieczarek | G01N 25/18 |
| 10,022,080 B2 * | 7/2018 | Chinnayelka | A61B 5/1411 |
| 2002/0054809 A1 | 5/2002 | Fischer | |
| 2007/0017295 A1 | 1/2007 | Ohta et al. | |
| 2007/0210538 A1 | 9/2007 | Steprath et al. | |
| 2007/0243034 A1 * | 10/2007 | Clarke | F16B 31/028 411/10 |
| 2008/0080955 A1 * | 4/2008 | Liu | F16B 37/14 411/429 |
| 2008/0253858 A1 | 10/2008 | Hsieh | |
| 2009/0120169 A1 * | 5/2009 | Chandler, Jr. | G01N 9/002 73/54.41 |
| 2009/0151466 A1 | 6/2009 | Wu et al. | |
| 2010/0061677 A1 * | 3/2010 | Brady | G01H 9/004 385/12 |
| 2010/0123310 A1 * | 5/2010 | Miller | F16L 33/2076 285/256 |
| 2011/0146412 A1 | 6/2011 | Hoering | |
| 2012/0018305 A1 * | 1/2012 | Yoshikawa | G01N 27/4077 204/431 |
| 2012/0198941 A1 * | 8/2012 | Smith | F16B 31/028 73/761 |
| 2015/0086293 A1 * | 3/2015 | Takakura | G02B 6/3624 411/337 |

FOREIGN PATENT DOCUMENTS

| | | |
|---|---|---|
| DE | 19710960 A1 | 9/1998 |
| DE | 19819301 C1 | 12/1999 |
| DE | 19854062 C1 | 11/2000 |
| DE | 19960040 A1 | 6/2001 |
| DE | 10111020 A1 | 9/2002 |
| DE | 10242256 A1 | 4/2004 |
| DE | 102004038638 B3 | 6/2006 |
| DE | 102005002592 A1 | 8/2006 |
| DE | 102005004060 A1 | 8/2006 |
| DE | 102006007385 A1 | 8/2007 |
| DE | 202005021750 U1 | 9/2010 |
| DE | 2009043267 A1 | 4/2011 |
| DE | 102009060441 A1 | 6/2011 |
| EP | 1764596 A2 | 3/2007 |
| EP | 1933121 A2 | 6/2008 |
| JP | 06347349 A | 12/1994 |
| JP | 2005/091086 A | 4/2005 |
| WO | WO-2006/015813 A1 | 2/2006 |
| WO | WO-2011/020454 A1 | 2/2011 |

OTHER PUBLICATIONS

The International Bureau of WIPO, Patent Cooperation Treaty (PCT) International Preliminary Report on Patentability, Chapter I, dated Sep. 23, 2014, 8 pgs., Geneva, CH.

* cited by examiner

SENSOR-CONTAINING CONNECTION ELEMENT AND MANUFACTURING METHOD

CROSS REFERENCE TO RELATED APPLICATIONS

This application is a divisional of United States national stage application Ser. No. 14/385,448 filed on Sep. 15, 2014, which claims the benefit of priority to International (PCT) Application No. PCT/EP2013/000824 filed on Mar. 19, 2013, which in turn claims the benefit of priority to German Patent Application No. DE 10 2012 005 614.1, filed on Mar. 22, 2012, the entire disclosures of which are incorporated herein by reference.

FIELD OF THE INVENTION

The invention relates to a support structure performing the task of a connection element with integrated sensor technology for detecting loads as well as the effective direction thereof with an interface for outputting measurement variables suitable for automated signal processing. The connection element may be, for example, a screw, a bolt, a threaded rod, a rivet or an anchoring bolt. The invention further relates to the manufacture of this arrangement by plastic shaping.

BACKGROUND OF THE INVENTION AND RELATED ART

In many areas of the prior art, for example in vehicle or machinery construction and in steel construction, when clamping a connection a defined mounting force has to be applied in order to ensure the operational reliability. In order to avoid damage or accidents, a sufficient pretensioning force has to be maintained during the entire life cycle of the connection. This may change, however, due to operating loads, temperature fluctuations or settling effects. Moreover, monitoring the acting forces, in particular also the transverse forces, may be desirable for checking the connection. Transverse forces may occur due to operating loads transversely to the connection axis, i.e. transversely to the longitudinal axis of the connection element. In order to permit the loading of the connection to be fully monitored, at least axial and transverse forces, but also optionally further variables such as temperature or air humidity have to be recorded by the measuring arrangement. As connection elements are used in many applications, the cost-effective manufacture is an important requirement for this type of product.

In order to ensure the load-bearing capacity of connections, the pretensioning force has to be monitored at regular intervals. This is, however, costly for commercially available screw means after completing the tightening process. Thus in many fields of application it is usual for personnel to monitor the arrangement at regular intervals, without the pretensioning force which actually prevails in the clamping means being known. In this case, either all screw means are retightened with an empirically determined force or preventatively replaced and often fastened with a predetermined tightening torque. In order to avoid unnecessary costs and to increase the reliability of the connection, therefore, it would be advantageous if the maintenance intervals were controlled as required. Maintenance cycles at chronologically fixed intervals also have the drawback that the connections could fail during the cycles. In order to be able to react as required, the axial force of the screw has to be monitored. To this end, various monitoring devices and arrangements are known, to which reference is made below.

Generally, a differential construction which has as a feature the cumulative combination of individual parts with potentially different materials is disadvantageous with regard to the complexity during manufacture and the resulting costs. From a technological perspective, the teaching based on a differential construction often has drawbacks due to the many individual parts in the flux of force and the resulting resilience and spreading due to the production tolerances of the individual components.

In principle, a differentiation is made as to whether the measuring elements or measuring devices are intended to test, monitor and/or record the connection. With different measuring principles, the measurement variables are evaluated during the use and manufacture of the connection. To this end, a transmission of data from the measuring arrangement is required. The suitability for automatic evaluation depends on the output signals of the measuring device.

Several arrangements are able to monitor alterations to the pretensioning force. Thus, in the invention DE 198 54 062 C1 it is proposed to permit the measurement variables to be recorded externally. This invention has the drawback that further elements have to be built into the connection which produce additional resilience, require particular measures and costs during the mounting procedure and the complexity of the construction is high.

Also in WO 2011/020454 A1 which generally refers to a device for determining and/or monitoring a pretensioning force of a screw connection, a sensor produces data dependent on the value of the pretensioning force and/or on an alteration to the pretensioning force and which are able to be electronically exploited. When this teaching is used, the construction has proved to be unsatisfactory as elements have to be positioned relative to one another which is costly.

A device is disclosed in EP 1 764 596 A2 which forwards the measurement results by means of radio technology. By means of the data interface which is already present, such a method is suitable for automatic evaluation. However, the measuring structure is very complex and thus not cost-effective. Additionally, the device is purely limited to the measurement of the pretensioning.

The teaching of U.S. Pat. No. 4,904,132 makes use of an optical output method: when altering the tensioning inside the connection element a display element incorporated in the screw head changes color. In this case, the continuous monitoring proves problematic and impossible for optically implemented systems.

It is proposed in DE 44 21 959 A1 to monitor visually the installation of a screw, whereby the pretensioning may be discretely detected. This proposed solution does not appear to be suitable for the purpose of continuous and automatic evaluation.

The invention disclosed in US 2002/0054809 A1 monitors the pretensioning force based on a mechanical method by means of disk springs and, in the case of failure of the screw, emits an optically readable signal. This teaching has the drawback that a further element has to be built into the connection which causes additional resilience, requires particular measures and costs during the mounting procedure and increases the complexity of the construction.

In principle, three different arrangements may be differentiated for monitoring the clamping force in a connection: the use of external devices, additional elements in the connection and the detection of the clamping force within or directly on the connection element.

Devices are not only known in order to be able to measure pretensioning forces during operation but also those which during the tightening process monitor the axial force prevailing in the connection.

As soon as the desired force is reached during the tightening procedure in the invention disclosed in DE 199 60 040 A1, the disclosed devices emit a signal. After the tightening procedure said devices are removed again and, as a result, are no longer available for measurements on the connection element.

For monitoring the clamping force by devices during operation, an arrangement is disclosed in DE 10 2005 002 592 A1 which is able to monitor the pretensioning force of the screw means. Said arrangement, however, does not remain permanently installed on the screw connection and also requires an operator.

Furthermore, a measuring device is disclosed in EP 1 764 596 A2 which is positioned on the screw head. Due to a hydraulic device and a measuring stick which is located in a bore inside the screw and moves proportionally with the axial expansion, alterations to the tension are detected. Drawbacks here are the complexity of the construction and the size of the device, whereby the potential uses are limited.

When using additional elements in order to measure the alteration to the pretensioning force in connections, the sensor technology is not directly integrated in and/or on the connection element. DE 19854062 C1 discloses a washer which is either inserted between the screw head and the tool or screw nut and tool. Due to the alterations to the thickness of dielectric layers and the resulting changes in capacitance, the prevailing pretensioning force is determined. This invention has the drawback that further elements have to be built into the connection which cause an additional resilience, require particular measures and costs during the mounting procedure and increase the complexity of the construction.

A similar concept is also used in DE 10 2009 043 267 A1. A drawback in these inventions is that the capacitive sensor is not installed in the screw itself which may give a false reading of the measurement.

In DE 39 34 952 A1 a further monitoring arrangement is proposed which contains a force sensor recording the pretensioning force of the connection element in the installed position and mounted adjacent to the connection element. The force sensor is implemented in the form of a spring arrangement and an associated spring path-dependent switching contact. When reaching the desired pretensioning of the connection element, the switching contact is closed. The switching position is monitored for periodically checking the pretensioning force by means of an electrical test circuit. This invention has the drawback that a further element has to be built into the connection which causes additional resilience, requires specific measures and costs during the mounting procedure and increases the complexity of the construction.

Arrangements are regarded as more advantageous, therefore, in which elements for detecting the clamping force are attached inside or directly onto the connection element. Such an approach is disclosed in DE 10 2009 060 441 A1. The sensitive layers on the surface are disadvantageous here. These layers may be easily damaged during the mounting procedure or during operation which leads to a false reading of the measurement values.

Also disclosed in DE 10 2004 038 638 B3 are connection elements with an integrated sensor for determining axial forces. A transducer which has piezoelectric properties integrated in the screw head emits ultrasonic waves which are reflected at the screw end. The same transducer also serves as a sensor in order to record the acoustic signals emitted. With an alteration to the axial tension of the screw, the ultrasonic permeability of the material alters and thus conclusions may be drawn about the pretensioning force still present. A drawback is the susceptibility to interference from the surroundings.

DE 197 10 960 A1 discloses a fastening screw, characterized in that the bearing surface of the screw head is coated with a piezoceramic, electrically insulating and electrically conducting material and the electrically conducting layers may be contacted at a point which is accessible in the screwed state, the signals thereof being electronically forwarded. The sensitive layers on the surface are disadvantageous here. Said layers may be easily damaged during the mounting procedure or during operation which leads to a false reading of the measurement values.

In addition to the disclosed claims for measuring axial forces in tensioning elements, methods and arrangements for measuring transverse forces are also known. Generally force measuring bolts are used here. The difference here is whether these arrangements are also intended to fulfill the purpose of a connection element.

A force measuring bolt with integrated measurement sensor technology is disclosed in EP 1 933 121 A2. Due to the many individual parts and shaped elements required, however, it is a costly construction.

The measurement of mechanical stresses by means of ultrasonic waves which are produced by piezoactuators is carried out in DE 10 2004 038 638 B3. The shear stress inside the bolt alters the ultrasonic permeability of the material which in turn permits conclusions to be drawn about the stress state.

Shear forces occurring in a bolt may also alternatively be determined by means of strain gauges, as shown in the teaching of DE 10 2005 004 060 A1. In the cited arrangement, this is a measuring bolt. The cost when applying this teaching appears to be excessively high for fastening purposes.

Also DE 10 2006 007 385 A1 detects shear forces occurring in a bolt by means of strain gauges and thus does not satisfy any connection purpose.

Suitable within the meaning of the invention are force measuring bolts which also satisfy the object of a connection element and are able to detect loads transversely to the connection axis. DE 101 11 020 A1 discloses such a connection element with a magnetically sensitive element generating a magnetic field and spaced apart therefrom. The proposed connection element is particularly suitable for detecting a force or mechanical stress acting on the seat of a vehicle. The load-bearing capacity of this connection element is, however, reduced by its type of construction as it is slotted over extensive areas.

DE 102 42 256 A1 discloses a force measuring bolt which is provided with a thread and, therefore, may be used as a screw means. A force measuring bushing may be provided for measuring force, said force measuring bushing being integrated in the resilient screw shank. In the case of shear load, a tensile/compressive stress is produced in the shank which is detected by the sensor technology. A drawback is the complex construction which is demanded by the geometric elements required.

OBJECT AND SUMMARY OF THE INVENTION

It is the object of the invention to provide a support structure with a sensor unit, which may serve as a connection element with integrated sensor technology for receiving axial and/or transverse loads when clamping the connection and/or during operation. In this case, a similar load-bearing capacity is intended to be achieved as is present in commercially available fastening screws. The sensor design is intended to be able to be extended by temperature and humidity sensors in order to compensate for interference on the load measurement.

In order to prevent gaping of the components in the connection under tensile stress, the sensor unit is intended to be inserted into the support structure by axial pretensioning. Moreover, the contact region between the support structure and the sensor unit is intended to provide a sufficient bearing surface in order to ensure the flux of force between the components.

The measuring principle and the remaining arrangement consisting of the signal forwarding and interfaces are intended to be able to permit a continuous signal transmission.

The teaching according to the invention is also intended to serve for producing the support structure at low cost. A small constructional space requirement for the sensor technology and the pretensioning thereof is to be required.

In order to produce the construction consisting of the support structure and sensor unit, a manufacturing method is also required which permits the integration of the sensor unit and the force transmission between the support structure and sensor unit. The manufacturing method is intended to permit the simultaneous shaping of the support structure and the embedding of the sensor unit.

DESCRIPTION OF EXEMPLARY EMBODIMENTS OF THE INVENTION

According to the invention, the proposed construction substantially consists of a longitudinally oriented support structure (14) and a sensor unit (10). The object of the support structure (14) is that of a connection element. The support structure (14) consists of a threaded region (1) at the ends thereof, as well as a top part (7), or alternatively, a further threaded region (1) or a further top part (7). A resilient region (2) inside which the sensor unit (10) is integrated is provided in addition. The sensor unit (10) in this case is located in the secondary flux of force of the support structure (14) and is arranged coaxially in the interior thereof. In order to exploit further the advantages of this simple construction, the sensor unit (10) is intended to be integrated during the manufacturing process of the support structure (14). The sensor unit (10) undertakes the task of measuring the axial pretensioning force acting in the connection element as well as transverse forces which are present in the connection element. In order to permit continuous monitoring, embodiments are proposed for signal forwarding (8). Moreover, the connection element may be extended by a plastic expansion region (6).

In order to produce the support structure (14) in a manufacturing method using shaping technology, it is necessary to act upon the support structure (14) using tools or tool segments in the radial direction in order to produce the undercuts in the axial direction for receiving the sensor unit (10) inside the support structure (14). In this case, the shaping forces are not permitted to exceed the capacity of the sensor unit (10) to withstand stresses. During the plasticization of the support structure (14), the sensor unit (10) is integrated such that a combined non-positive and positive connection is produced between the support structure (14) and the sensor unit (10). This is achieved by the resulting internal stresses after the shaping process at room temperature, and/or by additional local or global heating of the support structure (14) from outside, and/or by process heat during the manufacture of the support structure (14) and the subsequent shrinkage by cooling which is blocked by the undercuts produced on the support structure (14), and by the presence of the sensor unit (10) at this point. By the angle of the contact geometry (26) on the sensor unit (10) and the support structure (14), the resulting axial tensile stresses (19) produced from the internal stresses and the loading of the sensor unit may be suitably adjusted during the manufacturing process. The angle (26) which is best suited may be determined for a given geometry and load using established mechanical methods, such as for example finite element methods. The method may additionally provide for the superposition of a longitudinal force (25) during the joining process on the support structure (14), in order to produce or reinforce the internal tensile stresses in the support structure (19) after the process. Generally, the axial tensile stresses in the support structure (14), and thus the pretensioning forces for the sensor unit (10), may be increased by axial tensile stress (25) during the joining process.

According to the invention, the measurement values may be used both during the tightening process of the screw connection and during operation. It is particularly advantageous here that no modification has to be made to the construction.

A further particular advantage of the simple construction is the scalability of the arrangement. Variables and measurement ranges may thus be adapted according to requirements as no additional elements are required.

The support structure (14) may be designed to be continuously hollow (9) inside. As a result, the deformability of the support structure (14), and thus the operating capacity, is increased. Moreover, the resilient region (2) absorbs the pretensioning in the case of changing loads. If, during operation or during the clamping of the connection, the support structure (14) is subject to a longitudinal force in the pulling direction, the resilient expansion region ensures that unauthorized lengthening and/or plasticization does not occur in the longitudinal direction, so that the pretensioning of the support structure (14) and sensor unit (10) is maintained during and after the loading by the pulling force.

Figure 11:
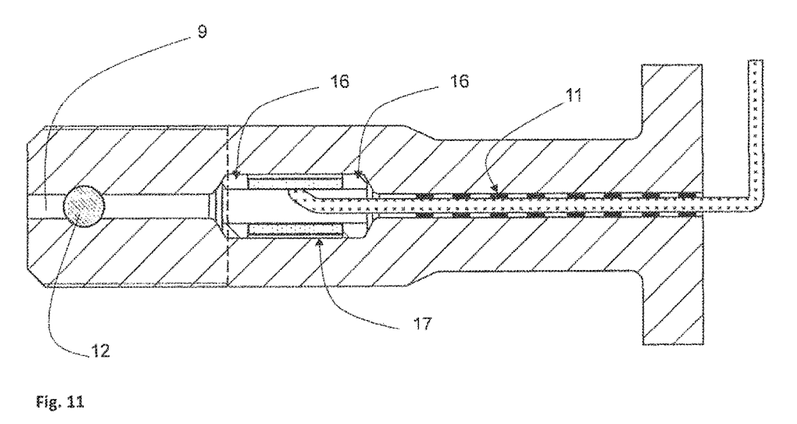
FIG. 11 is a section view of a connection element according to another exemplary embodiment of the invention.

The sensor unit (10) consists of a conventional construction for detecting loads, known from the relevant teaching books, such as for example Jorg Hoffmann: Handbuch der Messtechnik. Carl Hanser, Munich 2007 (3rd Edition). ISBN 978-3-446-40750-3, or Karl-Heinrich Grote, Jorg Fedhusen (Pub.): Dubbel-Taschenbuch für den Maschinenbau. 23rd Edition. Springer, Berlin 2011. The application, for example, of strain gauges on a support is proposed. Similarly, a support ring (17) may also be embedded in protective caps (16), as best shown in FIG. 11. Also other measuring principles, which convert a mechanical load into an electrical variable, such as capacitive, piezoresistive or piezoelectrical, are possible and may replace the resistive measuring principle. The sensor design may be enhanced by temperature and humidity sensors in order to compensate for potential interference in the load measurement. The sensor unit is configured, in particular, for detecting mechanical and/or thermal measurement variables.

According to the invention, the sensor body (10) is located in the secondary flux of force of the connection element and is thus influenced directly by alterations to the load conditions of the support structure (14). The technical measurement position, therefore, is located in the middle of the support structure (14). Thus, the sensor unit is also protected. In order to exploit further the advantages of the construction, the sensor unit (10) is integrated in the support structure (14) by a combined non-positive and positive connection. Thus a more reliable force transmission between the support structure (14) and the sensor unit (10) is ensured in the direction of the connection axis and transversely thereto.

Exemplary embodiments are shown in the drawings and described in more detail in the following description.

Figure 1:
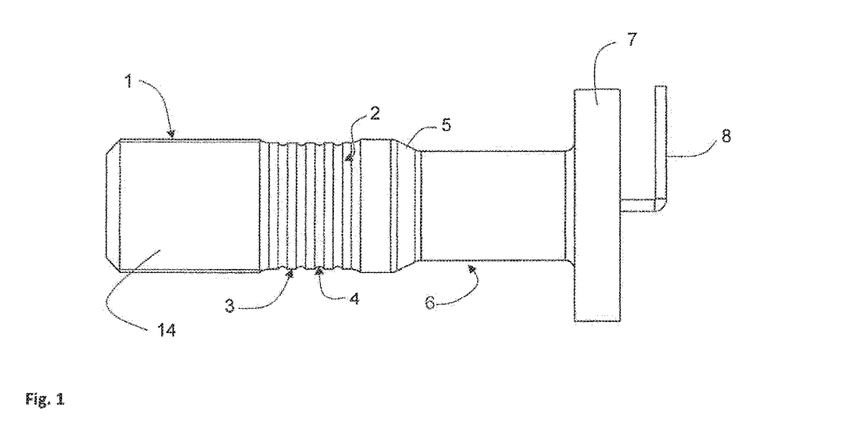
FIG. 1 is a plan view of a connection element according to an exemplary embodiment of the invention.

FIG. 1 shows the support structure (14) in the embodiment with a top part (7), a resilient region (2) and plastic expansion region (6) connected to a transition region (5), as well as to a threaded region (1). The top part (7) may be designed as a fastening aid with an external hexagonal contour, internal hexagonal contour, slotted contour, crosshead contour, or any other internal and/or external contour. In order to increase the rigidity of the connection element and thus the load-bearing capacity, the resilient region (2) is alternately provided with notched regions (4) and smooth regions (3) in order to exploit the stabilizing effect of the notches. If the support structure (14), during operation or during the clamping of the connection is subject to a longitudinal force in the pulling direction, the resilient expansion region (6) ensures that unauthorized lengthening and/or plasticization does not occur in the longitudinal direction, so that the pretensioning of the support structure (14) and sensor unit (10) during and after loading is maintained by the pulling force. For the signal transmission, a cable connection (8) is proposed.

Figure 2:
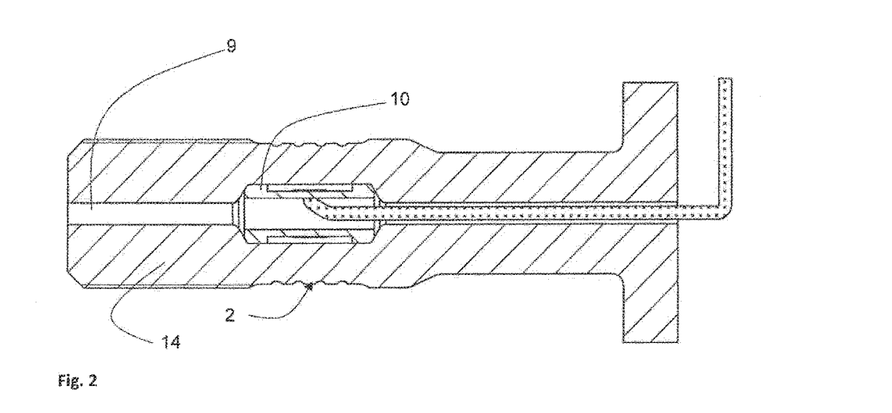
FIG. 2 is a section view of the connection element of FIG. 1

FIG. 2 shows the section of the embodiment described in FIG. 1. The connection element is provided along the longitudinal axis with a bore (9). The integrated sensor unit (10) is arranged inside the resilient region (2) coaxially thereto.

Figure 3:
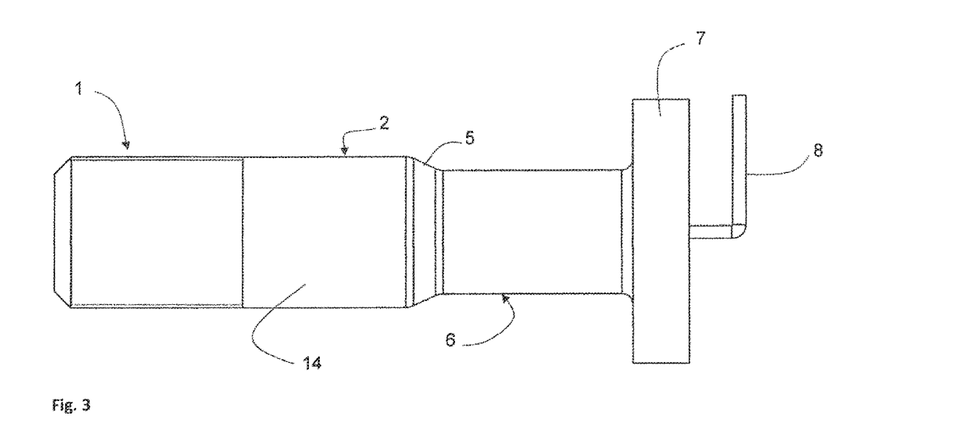
FIG. 3 is a plan view of a connection element according to another exemplary embodiment of the invention.

FIG. 3 shows the support structure (14) in the embodiment with the resilient region (2) and plastic expansion region (6) connected to a transition region (5), wherein the resilient region (2) is not notched. The other elements correspond to the embodiment described above.

Figure 4:
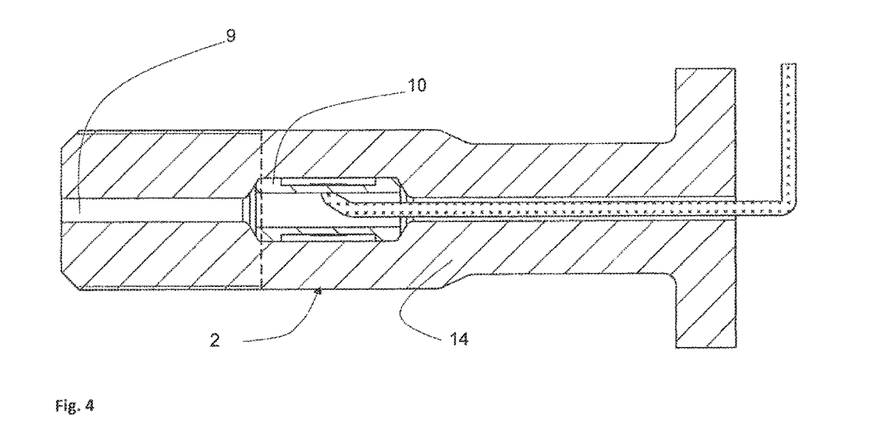
FIG. 4 is a section view of the connection element of FIG. 3.

FIG. 4 shows the section of the embodiment shown in FIG. 3. In the interior, the construction is identical to the embodiment shown in FIG. 2.

Figure 5:
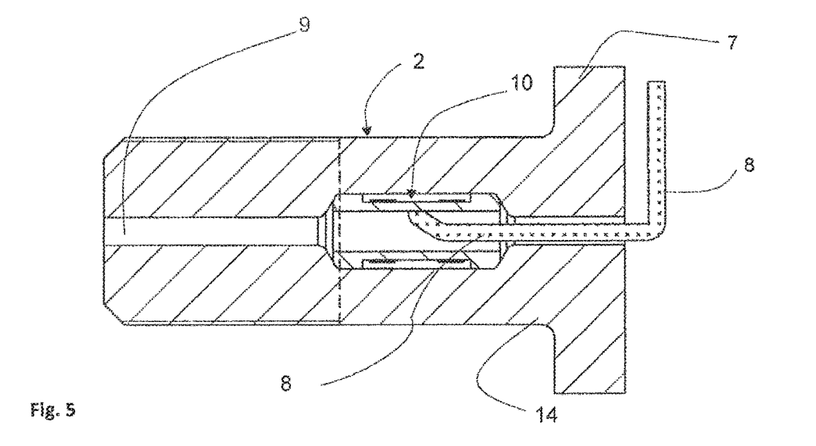
FIG. 5 is a section view of a connection element according to another exemplary embodiment of the invention.

FIG. 5 shows the support structure (14) in the embodiment with a top part (7), a resilient expansion region (2) and a threaded region (1). The connection element is provided along the longitudinal axis with a bore (9). The integrated sensor unit (10) is arranged inside the resilient region (2). The proposed embodiment differs from the embodiments described above in that no plastic expansion region is provided. By the size and type of this embodiment, it is suitable as a wheel bolt.

Figure 6:
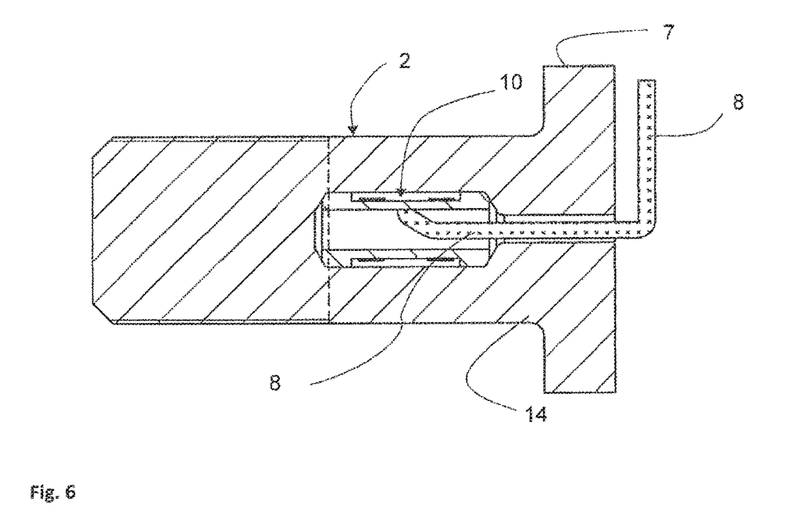
FIG. 6 is a section view of a connection element according to another exemplary embodiment of the invention.

The embodiment proposed in FIG. 6 differs from the embodiments described above in that the support structure (14) is only hollow in sections. The preform of such an embodiment may be implemented, for example, by the reverse cup extrusion method.

Figure 7:
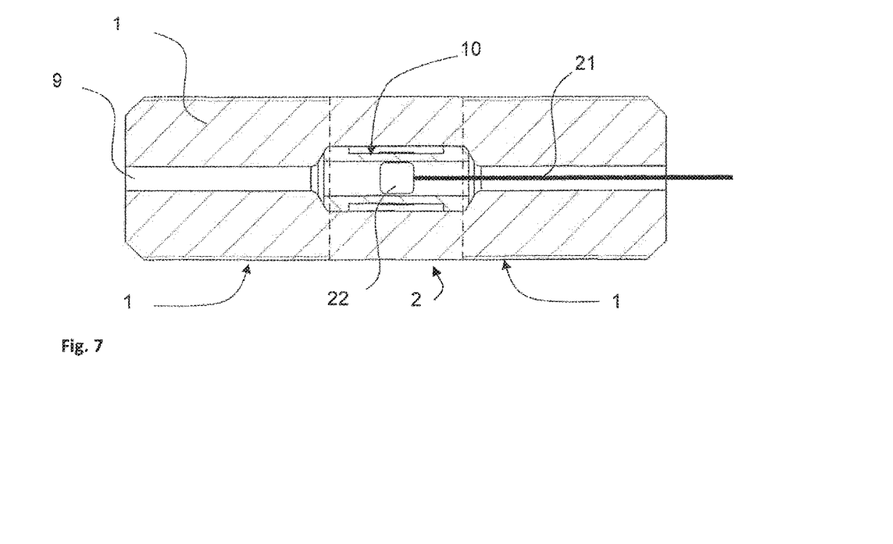
FIG. 7 is a section view of a connection element according to another exemplary embodiment of the invention.

FIG. 7 shows the support structure (14) in the embodiment with two threaded regions (1) and a resilient expansion region (2), wherein the resilient expansion region (2) is not notched. The other elements correspond to the embodiment described above. Moreover, a wireless method is proposed for the signal transmission. Necessary elements are a circuit for converting the wireless signals (22), as well as an antenna for transmission (21).

Figure 8:
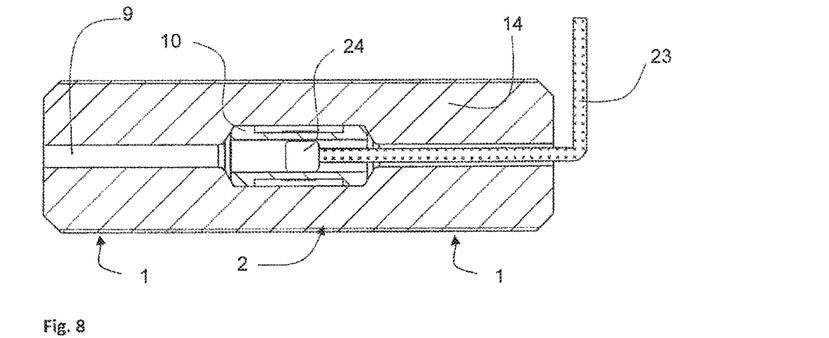
FIG. 8 is a section view of a connection element according to another exemplary embodiment of the invention.

FIG. 8 shows the support structure (14) in the embodiment with two threaded regions (1) and a resilient expansion region (2), wherein the resilient expansion region (2) is notched to increase the load-bearing capacity by the stabilizing effect of the notches, as a result of the continuous thread (1). The other elements correspond to the embodiment described above. Moreover, an optical method is proposed for the signal transmission. Required elements are a circuit for the conversion into optical signals (24) as well as an optical waveguide (23).

Figure 9:
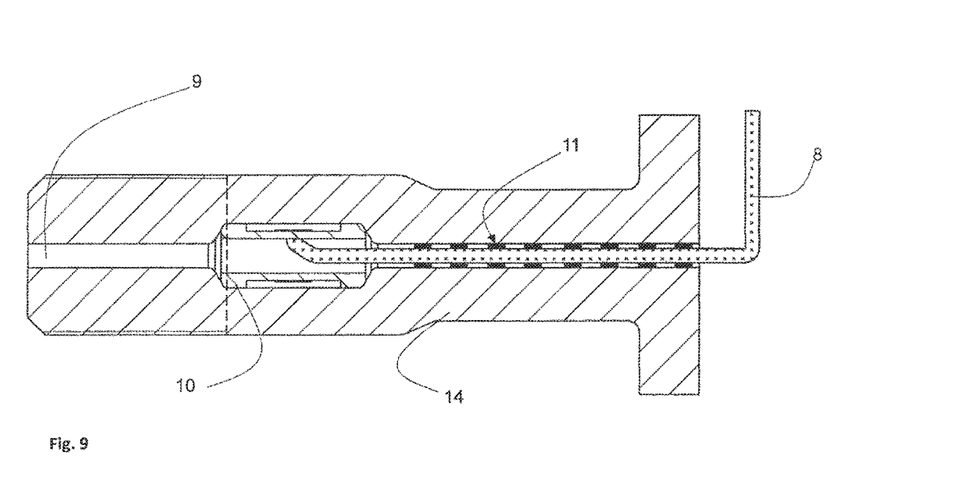
FIG. 9 is a section view of a connection element according to another exemplary embodiment of the invention.

In FIG. 9, an embodiment is shown in which the cable connection for the signal transmission (8) is provided with strain relief (11). The strain relief is produced during the manufacture of the support structure (14). Thus the connection element is additionally sealed on one side. The further construction corresponds to the embodiments described above.

Figure 10:
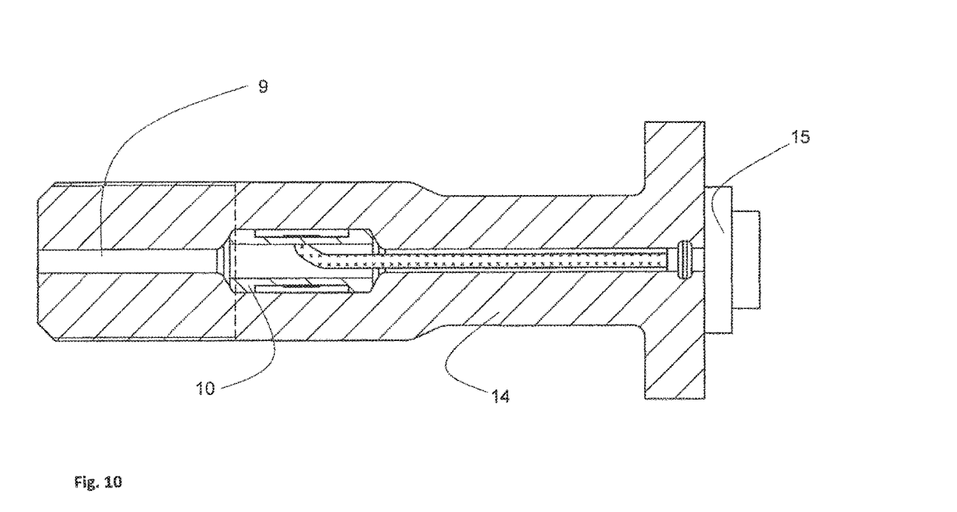
FIG. 10 is a section view of a connection element according to another exemplary embodiment of the invention.

FIG. 10 shows an embodiment in which an interface for signal transmission (15) is introduced at the end of the support structure (14).

FIG. 11 shows an embodiment in which additionally a sealing ball (12) is inserted in the screw end. Thus, the connection element may be sealed on one side or according to the embodiments of FIGS. 9 and 10, also on both sides. The further construction corresponds to the embodiments described above. Moreover, it is proposed to construct the sensor unit (10) so as to be divided into two protective caps (16) and a support ring (17).

Figure 12:
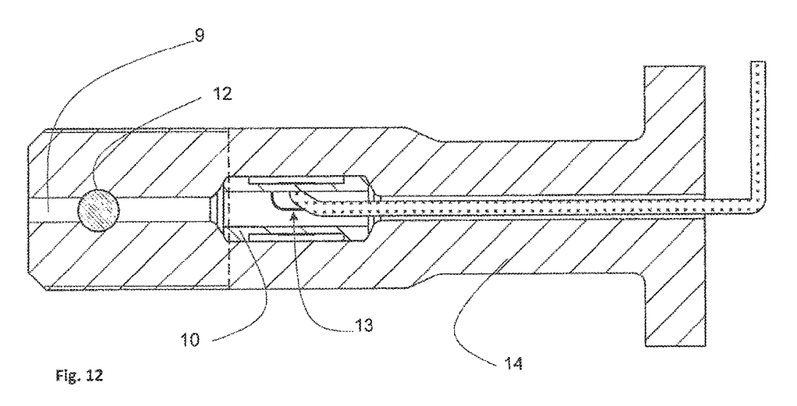
FIG. 12 is a section view of a connection element according to another exemplary embodiment of the invention.

In order to be able to compensate for thermally induced measurement signals of the sensor unit (10), according to the embodiment of FIG. 12, the use of a temperature sensor (13) is provided. This sensor measures the temperatures in the region of the sensor unit (10). The construction is suitable for uniform heating of the connection element during operation. The proposed construction may also be used in the embodiments described above.

Figure 13:
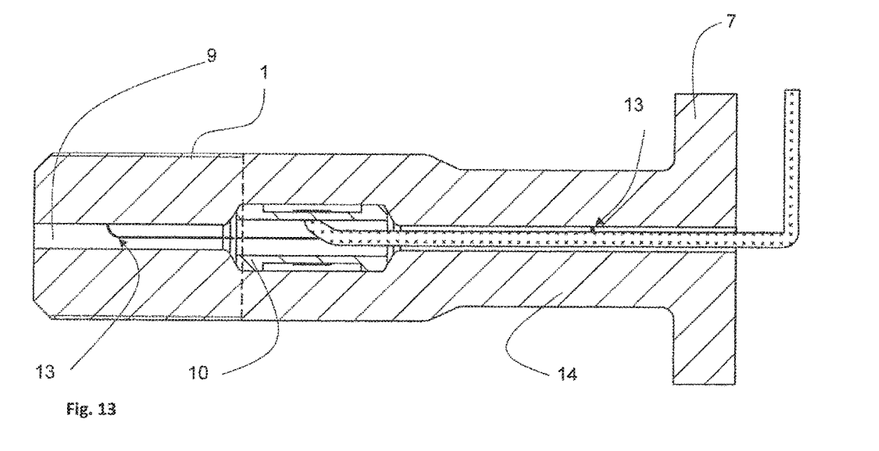
FIG. 13 is a section view of a connection element according to another exemplary embodiment of the invention.

The embodiment according to FIG. 13, similar to the embodiment according to FIG. 12, provides the use of temperature sensors in order to be able to compensate for the influence of thermally induced measurement signals on the sensor unit (10). In the case of uneven heating of the connection element over the longitudinal axis during operation, the temperatures are detected in the region of the threaded region (1) and in the region of the top part (7). The proposed construction may also be used in the embodiments described above.

Figure 14:
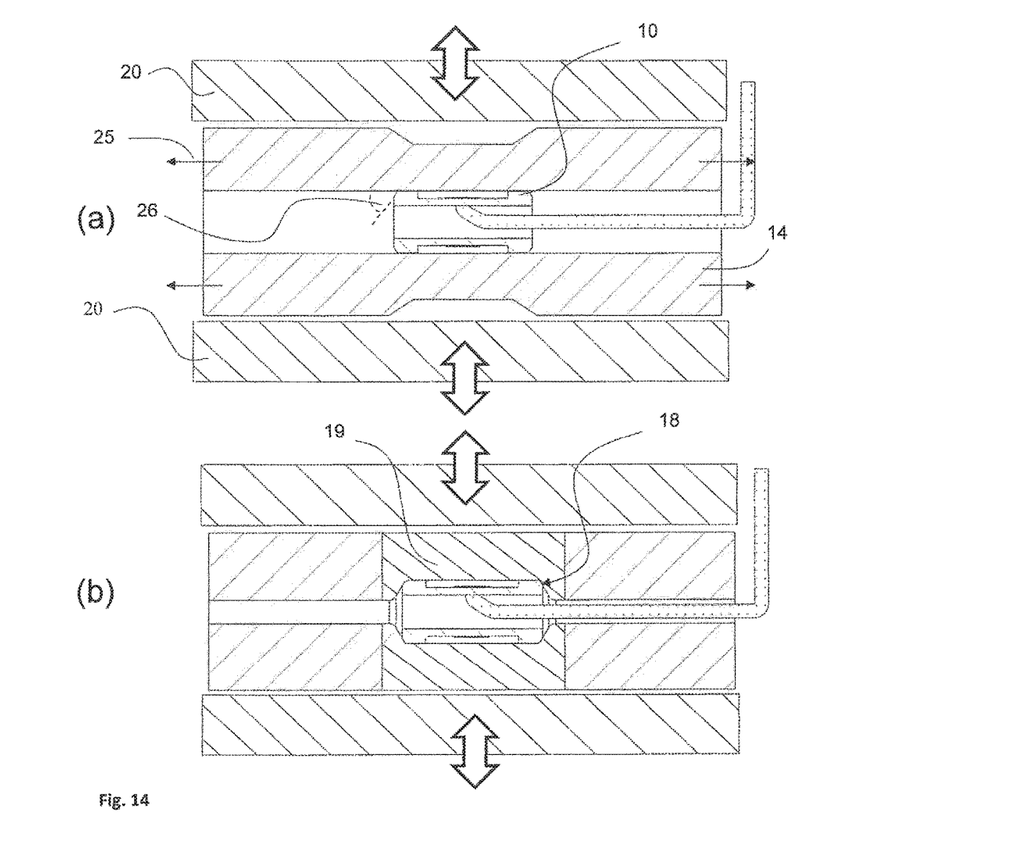
FIG. 14 is a section view of a connection element according to another exemplary embodiment of the invention.

In the embodiment according to FIG. 14, an initial geometry of the support structure and an arrangement of tool segments (20) is provided in order to act on the support structure (14) in the radial direction, as proposed in FIG. 14, so that the undercuts and the contact region (18) are produced for receiving the sensor unit (10) inside the support structure (14). This process sequence is similarly known, for example, from rotary kneading. After the process, the presence of axial tensile stresses (19) in the marked region, introduced by internal stresses as a result of plasticization with or without a superimposed longitudinal force (25) during the plasticization or/and by thermal shrinkage of the support structure (14), blocked by the undercuts produced on the support structure (14) and by the presence of the sensor unit (10) at this point, is important in order to achieve thereby a pretensioning of the sensor unit. Also important is a corresponding geometry in the contact region (18) between the support structure (14) and the sensor unit (10) for the force transmission. The contact region is determined, in particular, by the initial geometry. In particular, the angle of the contact geometry (26) on the sensor unit (10) and support structure (14) has an influence on the resulting axial tensile stresses (19) caused by the internal stresses and the loading of the sensor unit during the manufacturing process.

That which is claimed is:

1. A method of manufacturing a connection element comprising:
    providing a support structure that is at least partially hollow;
    providing a sensor unit that is configured to be received within the support structure;
    positioning the sensor unit inside the at least partially hollow support structure;
    joining the support structure and the sensor unit using radially movable tool segments to exert a force on the support structure in a radial direction
    thereby at least partially reducing a periphery of the support structure in a region of the support structure in which the sensor unit is positioned;
    wherein the support structure is subjected to a plastic deformation as a result of the force exerted on the support structure by the radially movable tool segments; and
    wherein at least a portion of the sensor unit is positively connected to the support structure by means of the plastic deformation of the support structure.

2. The method as claimed in claim 1, further comprising at least one of heating the support structure and cooling the sensor unit before a joining the support structure and the sensor unit.

3. The method as claimed in claim 1, further comprising superimposing a longitudinal force on the support structure while joining the support structure and the sensor unit.

4. The method as claimed in claim 1, wherein a portion of the sensor unit is non-positively connected to the support structure and a portion of the sensor unit is positively connected to the support structure by means of the plastic deformation of the support structure.

5. The method as claimed in claim 4, wherein a combined non-positive connection and positive connection between the support structure and the sensor unit is produced by at least one of the following:
    internal stresses resulting from the force exerted on the support structure using the radially movable tool segments at room temperature;
    application of at least one of an additional local heating of the support structure and an additional global heating of the support structure; and
    application of a process heat during manufacture of the support structure and subsequent shrinkage by cooling.

6. The method as claimed in claim 1, wherein at least one undercut is formed in the support structure in a contact region between an axial end of the sensor unit and the support structure.

7. The method as claimed in claim 1, wherein the connection element comprises at least one threaded region at an end of the connection element and at least one top part.

8. The method as claimed in claim 1, wherein the connection element comprises a resilient region inside which the sensor unit is integrated.

9. The method as claimed in claim 8, wherein the sensor unit is located in a secondary flux of force of the support structure and is arranged coaxially inside the at least partially hollow support structure.

10. The method as claimed in claim 9, wherein the connection element comprises a plastic expansion region disposed between the resilient region and an end of the connection element.

11. The method as claimed in claim 1, wherein the sensor unit is operable for measuring at least one of an axial pre-tensioning force and a transverse force in the connection element.

12. The method as claimed in claim 1, wherein the connection element comprises a cable connection for transmitting a signal from the sensor unit.

* * * * *